(12) United States Patent
Han et al.

(10) Patent No.: US 11,670,096 B2
(45) Date of Patent: Jun. 6, 2023

(54) APPARATUS AND METHOD FOR RECOGNIZING DRIVING LANE OF VEHICLE

(71) Applicants: HYUNDAI MOTOR COMPANY, Seoul (KR); KIA MOTORS CORPORATION, Seoul (KR)

(72) Inventors: Young Min Han, Gunpo-Gyeonggi-do (KR); Sung Yoon Yeo, Seoul (KR); Seo Hyeon Park, Suwon-si (KR); Seung Geon Moon, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 347 days.

(21) Appl. No.: 17/020,283

(22) Filed: Sep. 14, 2020

(65) Prior Publication Data

US 2021/0365693 A1 Nov. 25, 2021

(30) Foreign Application Priority Data

May 22, 2020 (KR) .......................... 10-2020-0061735

(51) Int. Cl.
*G06V 20/56* (2022.01)
*G05D 1/02* (2020.01)
*G06V 10/80* (2022.01)

(52) U.S. Cl.
CPC .......... *G06V 20/588* (2022.01); *G05D 1/0219* (2013.01); *G05D 1/0221* (2013.01); *G05D 1/0246* (2013.01); *G06V 10/809* (2022.01)

(58) Field of Classification Search
CPC .. G06V 20/588; G06V 10/809; G05D 1/0219; G05D 1/0221; G05D 1/0246; G06K 2009/6295; G06K 9/6292; G01C 21/30; G01C 21/3658; B60W 40/06; B60W 30/10; B60W 2552/10; B60W 2556/20; B60W 2556/35; B60Y 2300/10
USPC ........................................................ 382/104
See application file for complete search history.

(56) References Cited

U.S. PATENT DOCUMENTS

| | | | |
|---|---|---|---|
| 9,849,837 B2 | 12/2017 | Han et al. | |
| 10,140,527 B2 | 11/2018 | Han et al. | |
| 2010/0299000 A1* | 11/2010 | Nakamura | ............... B60R 1/00 348/148 |
| 2012/0197521 A1* | 8/2012 | Miyajima | .......... G01C 21/3602 701/411 |

(Continued)

FOREIGN PATENT DOCUMENTS

| | | | | |
|---|---|---|---|---|
| CN | 108153854 A | * | 6/2018 | ............. G06F 16/29 |
| KR | 10-1558786 B | | 10/2015 | |

(Continued)

*Primary Examiner* — Mahendra R Patel
(74) *Attorney, Agent, or Firm* — Morgan, Lewis & Bockius LLP

(57) ABSTRACT

An apparatus and method for recognizing a driving lane of a vehicle are provided. The apparatus includes an information acquisition device that acquires forward information of a road on which the vehicle is driving, and a processor that recognizes an entrance section and an exit section on a front left side of the vehicle based on the forward information, and determines a driving lane of the vehicle by correcting a number of lanes of the road in the entrance section and the exit section.

17 Claims, 13 Drawing Sheets

(56) References Cited

U.S. PATENT DOCUMENTS

| | | | | |
|---|---|---|---|---|
| 2015/0154458 A1* | 6/2015 | Lee | ............... | G06V 20/588 |
| | | | | 348/118 |
| 2015/0241232 A1* | 8/2015 | Park | ............... | B60W 30/12 |
| | | | | 701/412 |
| 2015/0379359 A1 | 12/2015 | Han et al. | | |
| 2016/0140401 A1* | 5/2016 | Ishigami | ............... | G06T 7/60 |
| | | | | 348/148 |
| 2017/0166127 A1* | 6/2017 | Han | ............... | B60W 30/12 |
| 2017/0255843 A1* | 9/2017 | Elwart | ............... | G01S 19/01 |
| 2020/0035102 A1* | 1/2020 | Satomura | ............. | G06V 20/582 |
| 2020/0225044 A1* | 7/2020 | Tohriyama | ......... | G01C 21/3848 |
| 2021/0094566 A1* | 4/2021 | Pietruska | ............. | G06V 20/588 |
| | | | | 348/118 |

FOREIGN PATENT DOCUMENTS

| | | | | |
|---|---|---|---|---|
| KR | 10-1782362 B | 10/2017 | | |
| KR | 10-1976682 B | 8/2019 | | |
| KR | 10-2078771 B | 2/2020 | | |
| WO | WO-2006128819 A1 * | 12/2006 | ........... | G08G 1/0104 |
| WO | WO-2018008082 A1 * | 1/2018 | ........... | G01C 21/165 |
| WO | WO-2020025991 A1 * | 2/2020 | ...... | B60W 30/18145 |
| WO | WO-2020123779 A1 * | 6/2020 | .......... | B60W 50/085 |

\* cited by examiner

APPARATUS AND METHOD FOR RECOGNIZING DRIVING LANE OF VEHICLE

CROSS-REFERENCE TO RELATED APPLICATION

The present application claims priority to and the benefit of Korean Patent Application No. 10-2020-0061735, filed on May 22, 2020, the entire contents of which are incorporated herein by reference.

TECHNICAL FIELD

The present disclosure relates to an apparatus and method for recognizing a driving lane of a vehicle.

BACKGROUND

The statements in this section merely provide background information related to the present disclosure and may not constitute prior art.

Driving lane recognition technology determines which of lanes from the left is a lane in which a vehicle having no precise map is currently driving, and is necessary for driver assistance functions such as a lane change assistance function and a motorway on-/off-ramp deceleration function.

In some sections, such as urban highways and automobile exclusive roads included in the operation range of driver assistance functions that do not use precision maps, there are a road that joins from the left or a road that branches off to the left. When a left land is newly generated, error may be caused in a driver assistance function due to inconsistency between the driving lane determined before the left lane is newly generated and an actual road shape because the conventional driving lane recognition technology determines which of lanes from the left is a lane in which a vehicle having no precise map is currently driving. Even when the left lane disappears, the driving lane determined before the left lane disappears may be inconsistent with an actual road shape, causing an error in the driver assistance function.

SUMMARY

An aspect of the present disclosure provides an apparatus and method for recognizing a driving lane of a vehicle, which recognize the driving lane of the vehicle in consideration of a change in the number of lanes of a driving road in an entrance/exit section located at the front left of the vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for recognizing a driving lane of a vehicle may include an information acquisition device configured to acquire forward information of a road on which the vehicle is driving, and a processor configured to recognize an entrance/exit section on a front left side of the vehicle based on the forward information, and determine a driving lane of the vehicle by correcting a number of lanes of a driving road in the recognized entrance/exit section.

The processor may perform matching of the driving lane and tracking of the driving lane using the forward information and determine the driving lane through fusion of a result of the matching of the driving lane and a result of the tracking of the driving lane.

The processor may determine matching reliability for the matching of the driving lane and tracking reliability for the tracking of the driving lane.

The processor may determine the driving lane by performing fusion on the result of the matching of the driving lane and the corrected result of the tracking of the driving lane based on the matching reliability and the tracking reliability.

The processor may correct a number of lanes of the driving road using a number of lanes of an on-/off-ramp, determine a correction type based on information on start and end points of the on-/off-ramp, and then correct the result of the tracking of the driving lane according to the correction type.

The processor may calculate the number of lanes of the driving road using a number of lanes of a main road before a junction point and a number of lanes of an on-ramp when recognizing the entrance section.

The processor may calculate the number of lanes of the driving road using a number of lanes of a main road after a branch point and a number of lanes of an off-ramp when recognizing the exit section.

The processor may correct the result of the tracking of the driving lane using a result of determination of a current driving lane, a number of lanes of the entrance section and the number of lanes of the driving road before the junction point when the correction type is an entrance-section start point.

The processor may correct the result of the tracking of the driving lane using a result of determination of a current driving lane, a number of lanes before the entrance section and a number of lanes of the entrance section when the correction type is an entrance-section end point.

The processor may correct the result of the tracking of the driving lane using a result of determination of a current driving lane, a number of lanes of the exit section and the number of lanes of the main road after the junction point when the correction type is an exit-section start point.

The processor may correct the result of the tracking of the driving lane using a result of determination of a current driving lane, a number of lanes before the exit section and a number of lanes of the exit section when the correction type is an exit-section end point.

The processor may perform the matching of the driving lane and the tracking of the driving lane using the forward information, determine the matching reliability for the matching of the driving lane and the tracking reliability for the tracking of the driving lane, determine the driving lane by performing fusion on the result of the matching of the driving lane and the result of the tracking of the driving lane based on the matching reliability and the tracking reliability, and correct the determined driving lane using the corrected number of lanes of the driving road.

According to an aspect of the present disclosure, a method for recognizing a driving lane of a vehicle may include acquiring forward information of a road on which the vehicle is driving, and recognizing an entrance/exit section on a front left side of the vehicle based on the forward information and determining the driving lane of the vehicle by correcting a number of lanes of a driving road in the recognized entrance/exit section.

The determining of the driving lane of the vehicle may include performing matching of the driving lane using the forward information, performing tracking of the driving lane using the forward information, determining matching reliability for the matching of the driving lane and tracking reliability for the tracking of the driving lane, correcting a result of the tracking of the driving lane using the corrected number of lanes of the driving road, and determining the driving lane by performing fusion on the result of the matching of the driving lane and the corrected result of the tracking of the driving lane based on the matching reliability and the tracking reliability.

The correcting of the result of the tracking of the driving lane may include correcting the number of lanes of the driving road using a number of lanes of an on-/off-ramp, determining a correction type based on information on start and end points of the on-/off-ramp, and correcting the result of the tracking of the driving lane according to the correction type.

The correcting of the number of lanes of the driving road may include calculating the number of lanes of the driving road using a number of lanes of a main road before a junction point and a number of lanes of an on-ramp when recognizing the entrance section The correcting of the number of lanes of the driving road may include calculating the number of lanes of the driving road using a number of lanes of a main road after a branch point and a number of lanes of an off-ramp when recognizing the exit section.

The correcting of the result of the tracking of the driving lane according the correction type may include correcting the result of the tracking of the driving lane using a result of determination of a current driving lane, a number of lanes of the entrance section and the number of lanes of the driving road before the junction point when the correction type is an entrance-section start point.

The correcting of the result of the tracking of the driving lane according the correction type may include correcting the result of the tracking of the driving lane using a result of determination of a current driving lane, a number of lanes of the exit section and the number of lanes of the main road after the junction point when the correction type is an exit-section start point, and correcting the result of the tracking of the driving lane using a result of determination of a current driving lane, a number of lanes before the exit section and a number of lanes of the exit section when the correction type is an exit-section end point.

The determining of the driving lane of the vehicle may include performing matching of the driving lane using the forward information, performing tracking of the driving lane using the forward information, determining matching reliability for the matching of the driving lane and tracking reliability for the tracking of the driving lane, determine the driving lane by performing fusion on the result of the matching of the driving lane and the result of the tracking of the driving lane based on the matching reliability and the tracking reliability, and correcting the determined driving lane using the corrected number of lanes of the driving road.

DRAWINGS

The above features and advantages of the present disclosure will be more apparent from the following detailed description taken in conjunction with the accompanying drawings.

DETAILED DESCRIPTION

Figure 1:
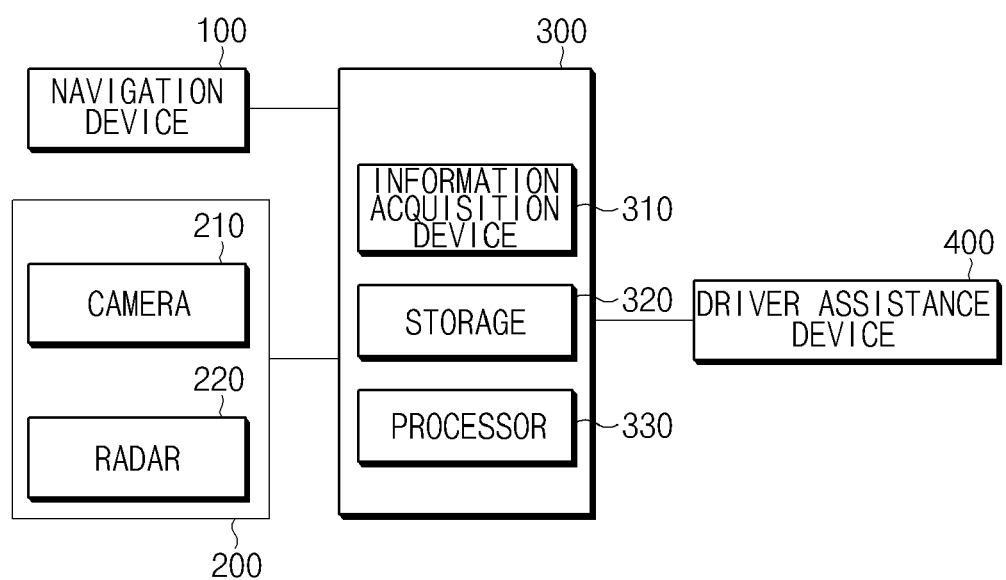
FIG. 1 is a block diagram of a vehicle according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

In this specification, a ramp is a road connecting two roads and may be classified into an off-ramp in which a vehicle exits (leaves) from a main road, and an on-ramp in which a vehicle enters (joins) the main road. A ramp junction (or terminal junction) is a site where the ramp connects to the main road, and collectively refers to a shift lane (deceleration/acceleration lane), a taper section, and a branch/junction with respect to the main road. The taper section refers to a roadway portion installed in a section in which a lane is separated or a section in which a lane is connected, to smoothly induce lane change of a driving vehicle.

Figure 2A:
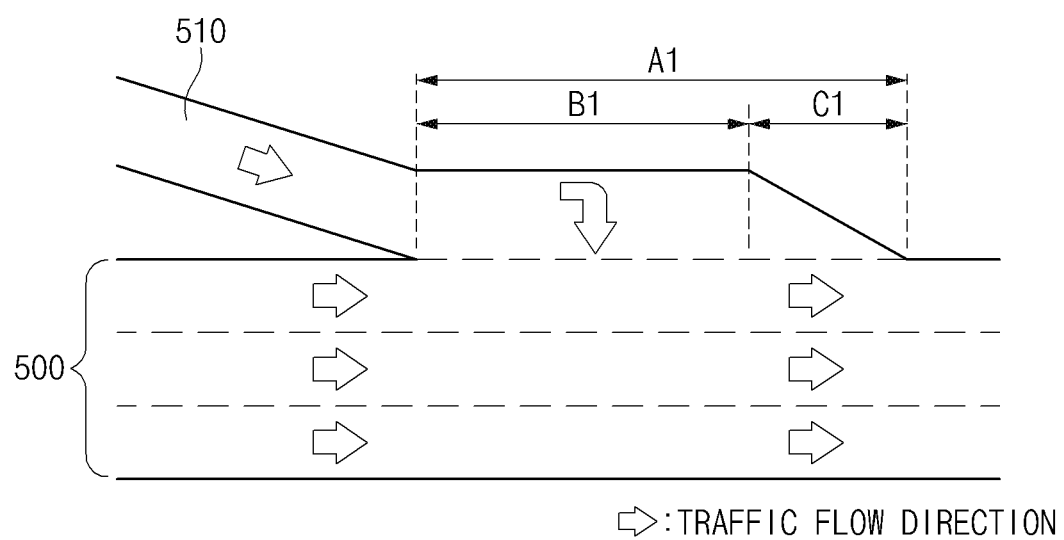
FIGS. 2A and 2B are diagrams for describing an exit section and an entrance section according to an embodiment of the present disclosure.
Figure 2B:
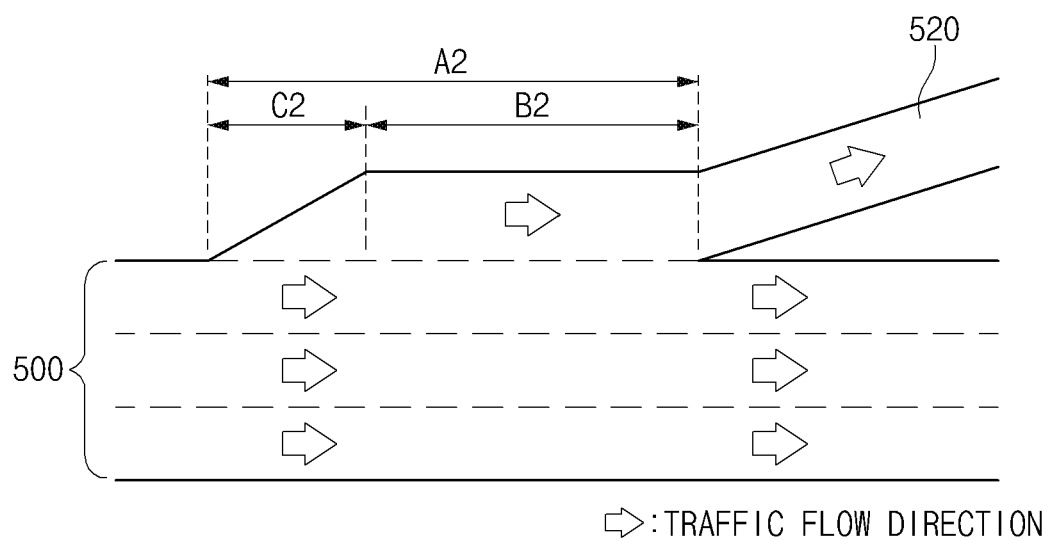
Figure 3A:
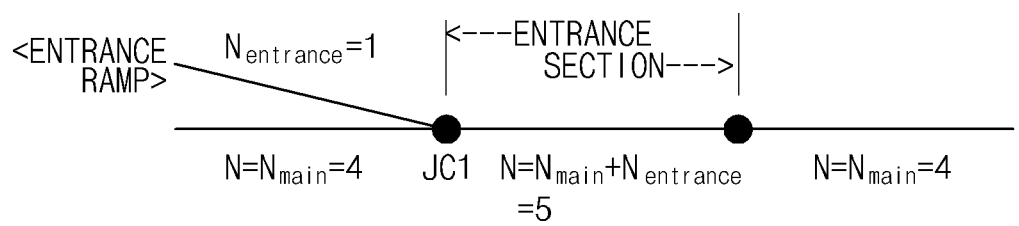
FIGS. 3A and 3B are diagrams for describing a method for correcting the number of lanes on a driving road according to an embodiment of the present disclosure.
Figure 3B:
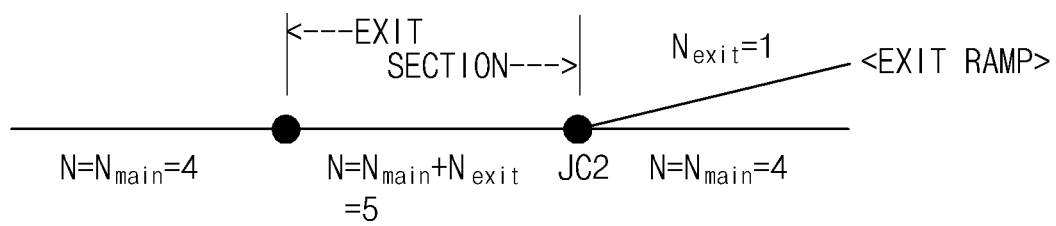

FIG. 1 is a block diagram of a vehicle according to an embodiment of the present disclosure, FIGS. 2A and 2B are diagrams for describing an exit section and an entrance section according to an embodiment of the present disclosure, and FIGS. 3A and 3B are diagrams for describing a method for correcting the number of lanes on a driving road according to an embodiment of the present disclosure.

Referring to FIG. 1, a vehicle may include a navigation device 100, a detection device 200, a driving lane recognition device 300, and a driver assistance device 400, which are connected through a vehicle network. The vehicle network may be implemented with, for example, a Controller Area Network (CAN), a Media Oriented Systems Transport (MOST) network, a Local Interconnect Network (LIN), Ethernet, and/or an X-by-Wire (Flexray).

The navigation device 100 may be mounted on the vehicle to match a current position to map data and search for and guide a route to a destination. The navigation device 100 may measure its current position. The navigation device 100 may measure its current position, that is, the vehicle's position using at least one of positioning techniques such as Global Positioning System (GPS), Dead Reckoning (DR), Differential GPS (DGPS), and Carrier phase Differential GPS (CDPGPS). The navigation device 100 may include a memory (not shown) for storing map data, a display (not shown) for displaying map information, a vehicle position and a found driving route, and a processor (not shown) for executing, for example, route search and route guidance.

The navigation device 100 may transmit information on a road on which the vehicle is driving, that is, a driving road, to the driving lane recognition device 300. The navigation device 100 may measure a vehicle position through a GPS receiver and match the measured vehicle position to the map data to identify a driving road. In addition, the navigation device 100 may extract information on the identified driving road from the map data. The driving road information may include a type of a driving road (main road) (e.g., general road and highway), the total number of driving lanes (hereinafter, the number of lanes), and branch road information. Here, the branch road information may include a branch point location, a junction point position, the number of lanes of an off-ramp (exit road), and the number of lanes of an on-ramp (entrance road).

The detection device 200 may detect surrounding information of a vehicle including line information, object information and the like. The detection device 200 may include a camera 210, a radar (Radio Detecting And Ranging) 220, and the like. The detection device 200 may extract line information from an image acquired through the camera 210. In addition, the detection device 200 may detect moving objects (e.g., a vehicle) and/or fixed objects (e.g., a guardrail or a center separator) located around the vehicle based on sensing data measured by the radar 220.

The camera 210 may be installed in front of the vehicle to capture a front image of the vehicle. The camera 210 may be implemented with at least of image sensors such as charge coupled device (CCD) image sensor, a complementary metal oxide semi-conductor (CMOS) image sensor, a charge priming device (CPD) image sensor, and a charge injection device (CID) image sensor. The camera 210 may include an image processor that performs image processing such as noise removal, color reproduction, file compression, image quality adjustment, and saturation adjustment on an image acquired through the image sensor. The radar 220 may be installed on the front of the vehicle to detect objects (moving and/or fixed objects) positioned adjacent to the front of the vehicle. The radar 220 may emit electromagnetic waves to a surrounding object, receive electromagnetic waves reflected from the object, and measure the distance, direction, and shape of the object.

The driving lane recognition device 300 may recognize a vehicle position in the driving road, that is, a driving lane, based on forward information of a road on which the vehicle is driving (that is, the driving road). The driving lane recognition device 300 may determine (identify) the driving lane of the vehicle by recognizing the entrance/exit section in the front left side of the vehicle based on the forward information and correcting the number of lanes of a driving road in the recognized entrance/exit section. Here, the entrance/exit section may refer to a section between the start point (starting point) and the end point of a ramp junction provided for exit from or entrance to the driving road of the vehicle, that is, the main road. Referring to FIG. 2A, the entrance section may refer to an on-ramp junction A1, which is a section where an on-ramp 510 connects to a main road 500. The on-ramp junction A1 may include an acceleration section B1 and a taper section C1. Referring to FIG. 2B, the exit section may be defined as a section in which an off-ramp 520 connects to the main road 500, that is, an off-ramp junction A2. The off-ramp junction A2 may include a deceleration section B2 and a taper section C2.

The driving lane recognition device 300 may include an information acquisition device 310, a storage 320, and a processor 330.

The information acquisition device 310 may acquire forward information of a driving road, that is, a main road, based on driving road information and/or surrounding information provided from the navigation device 100 and the detection device 200. The forward information may include the number of lanes of the driving road, a type of a ramp junction, information on start and end points of the ramp junction, line information, and object information. The type of the ramp junction may be classified into a left exit (left branch) ramp junction, a left entrance (left junction) ramp junction, a right exit (right branch) ramp junction, and a right entrance (right junction) ramp junction.

The storage 320 may store a program for the operation of the processor 330, and may store input data and/or output data of the processor 330. Also, the storage 320 may store forward information acquired by the information acquisition device 310. The storage 320 may be implemented with at least one of storage media, such as a flash memory, a hard disk, an SD card (Secure Digital Card), a random access memory (RAM), a static random access memory (SRAM), a read only memory ROM), a Programmable Read Only Memory (PROM), an Electrically Erasable and Programmable ROM (EEPROM), an Erasable and Programmable ROM (EPROM), and a register.

The processor 330 may control overall operation of the driving lane recognition device 300. The processor 330 may be implemented with at least one of an application specific integrated circuit (ASIC), a digital signal processor (DSP), a programmable logic device (PLD), field programmable gate array (FPGAs), a central processing unit (CPU), microcontrollers, and microprocessors.

The processor 330 may determine the driving lane on which the vehicle is driving among the lanes of the driving road based on the forward information acquired through the information acquisition device 310. The processor 330 may use a known driving lane determination method, but may correct a predetermined driving lane in consideration of a change in the number of lanes of the driving road in a recognized entrance/exit section when the entrance/exit section is recognized on the front left side of the vehicle.

First, a process of determining the driving lane using the forward information in the processor 330 will be briefly described.

The processor 330 may perform matching of a lane in which the vehicle is located, that is, the driving lane, among the lanes of the driving road by using the forward information acquired by the information acquisition device 310. The processor 330 may calculate a probability that a lane is a driving lane by assigning a matching point to each lane of the driving road, and perform matching of the driving lane using a matching point.

In addition, the processor 330 may track the driving lane of the vehicle based on the forward information acquired by the information acquisition device 310. The processor 330 may track the driving lane by identifying a change in a lateral distance of the vehicle by using the forward information acquired by the information acquisition device 310. The processor 330 may track the driving lane by determining whether there has been a lane change from the driving lane determined in the immediately preceding cycle at each predetermined cycle. The processor 330 may identify the driving lane determined in the immediately preceding cycle, and determine whether there is a lane change to a left or right lane using the forward information acquired by the information acquisition device 310 in the current cycle. Subsequently, the processor 330 may perform tracking of the driving lane by reflecting the confirmed lane change result to the driving lane determined in the immediately preceding cycle.

The processor 330 may determine matching reliability for matching of the driving lane and tracking reliability for tracking of the driving lane. Here, the matching reliability may mean the highest probability of probabilities that a lane is a driving lane for lanes of the driving road. When a matching point is assigned to each lane for matching of the driving lane, the processor 330 may determine matching reliability according to the highest matching points. The tracking reliability may be determined using the fusion reliability, which is the accuracy of determining the driving lane performed in the previous cycle, and the left/right lateral distance reliability confirmed by the camera 210, and the tracking reliability in the current cycle.

The processor 330 may determine a driving lane through fusion of a result of the matching of the driving lane and a result of the tracking of the driving lane based on matching reliability and tracking reliability. For example, when the matching reliability is higher than the tracking reliability, the processor 330 may determine the matched driving lane (result of matching of the driving lane) as a driving lane, and when the tracking reliability is higher than the matching reliability, may determine the tracked driving lane (result of tracking of the driving lane) as a driving lane.

When the driving lane of the vehicle is determined, the processor 330 may control various vehicle configurations for driving using the determined driving lane. The processor 330 may transmit a result of the determination of the driving lane to the driver assistance device 400. The driver assistance device 400 may assist (support) the driver's operation based on the result of the determination of the driving lane. The driver assistance device 400 may perform a driver assistance function such as a lane change assistance function and/or a motorway on-/off-ramp deceleration function.

Further, the processor 330 may determine whether to enter a branch road of a driving road based on the determined driving lane and determine departure from a route. The processor 330 may determine whether the vehicle has entered the branch road by comparing a result of the determination of the driving lane with information on the branch road ahead. The processor 330 may determine whether to depart from the route using the result of determining entrance to the branch road and the branch road information.

Next, a process of correcting the determination of the driving lane in the left entrance/exit section in the processor 330 will be described in detail.

The processor 330 may acquire forward information through the information acquisition device 310. The processor 330 may determine whether there is an entrance/exit section on the front left side of the vehicle using the acquired forward information. The processor 330 may extract information on the start and end points of an entrance/exit section from image information acquired by the camera 210 or extract information on the start and end points of the entrance/exit section from map data in the navigation device 100.

When the entrance/exit section is recognized on the front left side of the vehicle, the processor 330 may correct the number of lanes of a driving road in the recognized entrance/exit section. In the case of a general map or an Advanced Driver Assistance System (ADAS) map, it may not entirely indicate that the total number of lanes of a road is changed in a short section such as the entrance section or the exit section, correction may be performed in such a way to increase the total number of lanes of the entrance/exit section.

The number of lanes of the driving road in the entrance section (hereinafter referred to as the number of lanes of the entrance section) may be calculated as the sum of the total number of lanes on the main road before a junction point and the total number of lanes of an on-ramp. For example, as illustrated in FIG. 3A, when the total number Nmain of lanes of the main road on which the vehicle is driving is four and the total number Nentrance of lanes of the on-ramp is one, the processor 330 may calculate the number of lanes of the entrance section N (=4+1=5) by adding the number Nmain of lanes of the main road before a junction point JC1 and the number Nentrance of lanes of the on-ramp.

The number of lanes of a driving road in the exit section (hereinafter referred to as the number of lanes of the exit section) may be calculated by adding the total number of lanes of the main road after a branch point and the total number of lanes of an off-ramp. For example, as illustrated in FIG. 3B, when the total number Nmain of lanes of the main road on which the vehicle is driving is four and the total number Nexit of lanes of the off-ramp is one, the processor 330 may calculate the number of lanes of the exit section N (=4+1=5) by adding the number Nmain of lanes of the main road after a branch point JC2 and the number Nexit of lanes of the off-ramp.

The processor 330 may determine (detect) a correction type and a correction time point by using information on the start and end points of the entrance/exit section. Here, the correction type may be classified by the type and start and end points of the ramp junction recognized on the front left side of the vehicle, and may be classified into an entrance-section start point (junction point), an entrance-section end point, an exit-section start point, and an exit-section end point. The correction time may refer to a time point at which a vehicle passes through the start point or end point of the entrance/exit section.

TABLE 1

| Correction type | Correction method |
| --- | --- |
| Entrance-section start point | Result of determination of current driving lane + number of lanes of entrance section − number of lanes of main road before junction point |
| Entrance-section end point | Result of determination of current driving lane + number of lanes before entrance section − number of lanes of entrance section |
| Exit-section start point | Result of determination of current driving lane + number of lanes of exit section − number of lanes of main road after branch point |
| Exit-section end point | Result of determination of current driving lane + number of lanes before exit section − number of lanes of exit section |

Here, the result of determining the current driving lane is the driving lane determined in the current cycle, and the number of lanes of the entrance section is the number of lanes of the driving road in the entrance section that is the corrected number of lanes of the driving road. The number of lanes before the entrance section is the number of lanes of a driving road calculated just before the start point of the entrance section (before the number of lanes of the driving road is corrected), the number of lanes before the exit section is the number of lanes of the driving road in the exit section, which is the corrected number of lanes of the driving road, and the number of lanes before the exit section is the number of lanes of the driving road calculated immediately before the start point of the exit section. When the determined correction time point is reached, the processor 330 may perform (execute) correction on the result of the determination of the driving lane using the corrected number of lanes of the driving road according to a correction method matching the determined correction type.

For example, when an entrance section located on the front left side is recognized while the vehicle is driving on the second lane among the four lanes of a main road, the processor 330 may perform correction on the number (=4+1=5) of lanes of the driving road by adding the number of lanes of the main road and the number of lanes of an on-ramp. Therefore, the number of lanes of the driving road before correction is 4, and the corrected number of lanes of the driving road is 5. When passing through the start point of the entrance section, the processor 330 may correct a result of the determination of a current driving lane according to a correction method matching the start point of the entrance section, which is a correction type. In other words, because the result of the determination of the current driving lane is the second lane, the number of lanes of the entrance section is 5, and the number of lanes of the main road before joining is 4, the processor 330 may determine, as a corrected driving lane, a value (that is, 2+5−4=3) obtained by subtracting the number of lanes of the main road before the junction point from the sum of the result of determination of the current driving lane and the number of lanes of the entrance section.

The process of correcting the determination of the driving lane in the left entrance/exit section may be performed after the process of tracking the driving lane or after the process of fusion of the result of matching of the driving lane and the result of tracking of the driving lane.

Figure 4:
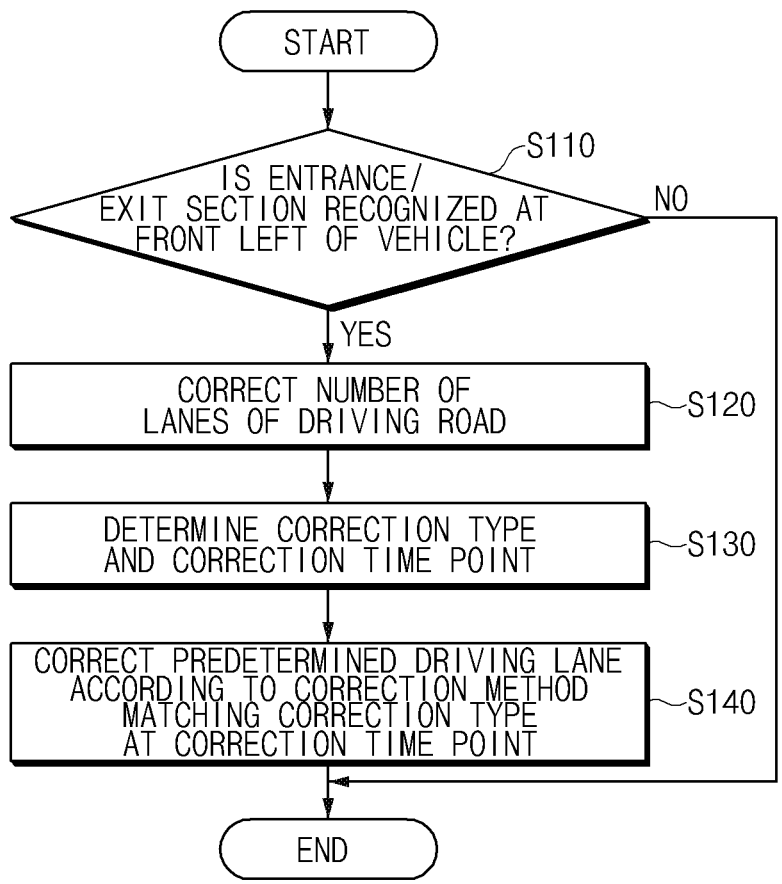
FIG. 4 is a flowchart of a method of correcting a result of determination of a driving lane according to an embodiment of the present disclosure.

FIG. 4 is a flowchart of a method of correcting a result of determination of a driving lane according to an embodiment of the present disclosure. The present embodiment describes a process of correcting a driving lane in an entrance/exit section located on the front left side of a vehicle.

The driving lane recognition device 300 may determine whether an entrance/exit section is recognized in the front left side of the vehicle (S110). The processor 330 of the driving lane recognition device 300 may identify the existence of a left entrance/exit section using forward information acquired through the information acquisition device 310.

The driving lane recognition device 300 may correct the number of lanes of the driving road when it is determined that the left entrance/exit section exits (S120). The processor 330 may correct the number of lanes of the driving road based on the number of lanes of the main road on which the vehicle is driving and the number of lanes of the on-/off-ramp.

The processor 330 may determine a correction type and a correction time point based on information on the start and end points of the recognized entrance/exit section (S130). Here, the correction type may be classified into an entrance-section start point, an entrance-section end point, an exit-section start point and an exit-section end point. The correction time point may refer to a time point at which the vehicle passes through the entrance/exit section.

The processor 330 may correct a predetermined driving lane by a correction method according to the correction type at the correction time point (S140). The processor 330 may identify a correction method matching the correction type by referring to a reference table in which correction methods according to correction types previously stored in the storage 320 are defined, that is, [Table 1]. The processor 330 may correct a driving lane determined in the current cycle according to the identified correction method.

Figure 5:
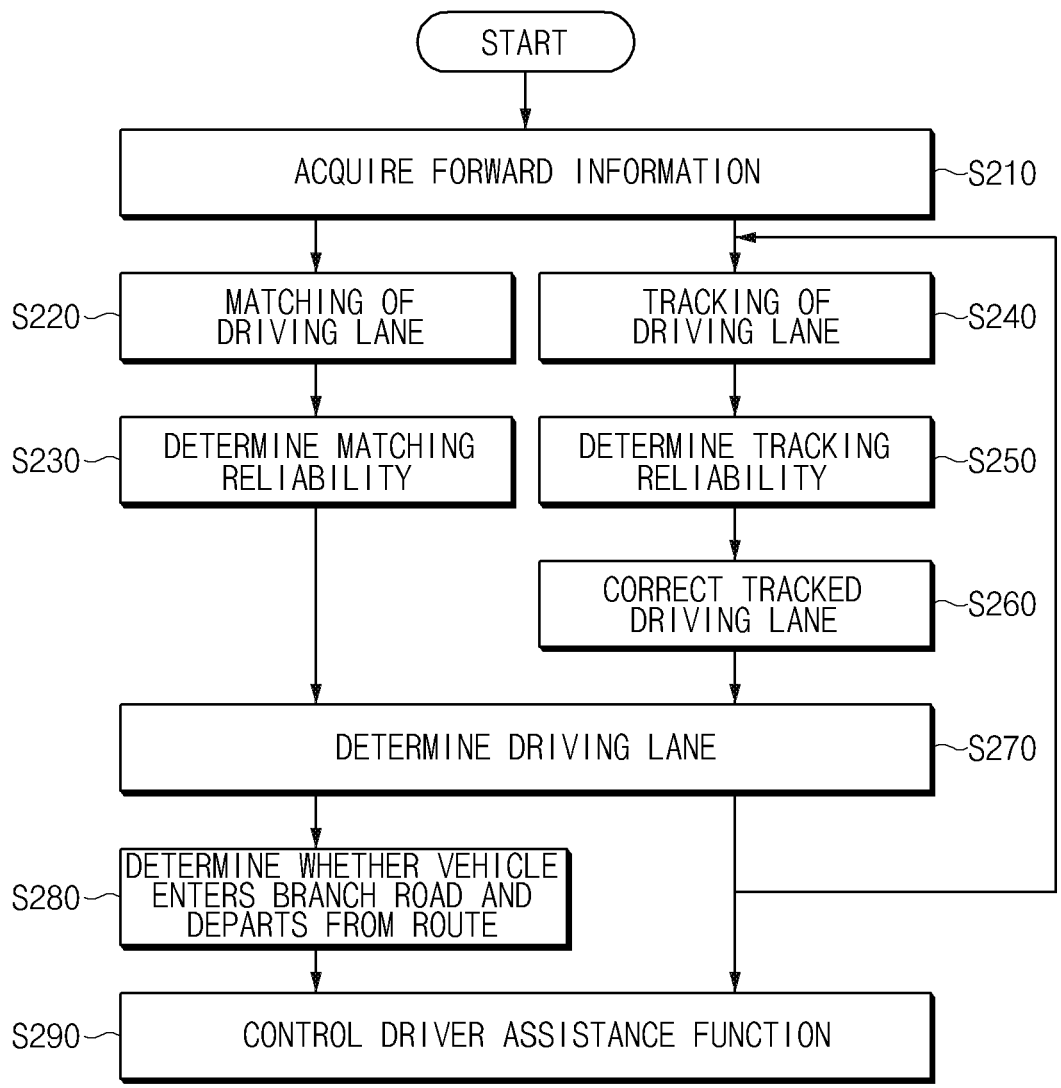
FIG. 5 is a flowchart of a method of recognizing a driving lane of a vehicle according to an embodiment of the present disclosure.

FIG. 5 is a flowchart of a method of recognizing a driving lane of a vehicle according to an embodiment of the present disclosure.

The driving lane recognition device 300 may acquire forward information (S210). The information acquisition device 310 of the driving lane recognition device 300 may identify the forward information of the vehicle using at least one of the camera 210 and the radar 220. In addition, the driving lane recognition device 300 may identify the forward information of the vehicle based on driving road information acquired from the navigation device 100.

The driving lane recognition device 300 may perform matching of the driving lane using the acquired forward information (S220). The driving lane recognition device 300 may assign a matching point to each lane of the driving road, and perform matching of the driving lane using the assigned matching point.

The driving lane recognition device 300 may determine matching reliability for matching of the driving lane (S230). Here, the matching reliability may mean a highest probability among probabilities that a lane is a driving lane for lanes.

The driving lane recognition device 300 may perform tracking of the driving lane using the acquired forward information (S240). The driving lane recognition device 300 may identify a change in the lateral distance of the vehicle (that is, whether lane change occurs) by analyzing image information acquired by the camera 210. The driving lane recognition device 300 may perform tracking of the driving lane using the driving lane determined in the immediately preceding cycle and a change in the lateral distance.

The driving lane recognition device 300 may determine tracking reliability for tracking of the driving lane (S250). Here, the tracking reliability may be identified by using the fusion reliability, which is the accuracy for the driving lane determined in the immediately preceding cycle, and reliability of the change in the lateral distance.

The driving lane recognition device 300 may correct the tracked driving lane when a left entrance/exit section is recognized in front of the vehicle (S260). The driving lane recognition device 300 may identify the entrance/exit section located on the front left side of the vehicle based on the acquired forward information. The driving lane recognition device 300 may correct the number of lanes of a driving road in the entrance/exit section and correct the tracked driving lane using the corrected number of lanes of the driving road.

The driving lane recognition device 300 may determine the driving lane by fusion of the result of matching of the driving lane and the corrected result of tracking of the driving lane based on the matching reliability and tracking reliability (S270). The driving lane recognition device 300 may determine, as the driving lane, the lane with higher reliability among the lane identified by matching of the driving lane and the lane identified by tracking of the driving lane.

The driving lane recognition device 300 may determine whether the vehicle enters a branch road and the vehicle departs from the route based on the determined driving lane (S280). The driving lane recognition device 300 may determine whether the vehicle enters a branch road by comparing the result of determination of the driving lane with information on the branch road ahead. The driving lane recognition device 300 may determine whether the vehicle departs the route based on the result of determining whether the vehicle enters a branch road and the information on the branch road.

The driving lane recognition device 300 may control the driver assistance function based on the determined driving lane (S290). The driving lane recognition device 300 may transmit the result of determination of the driving lane to the driver assistance device 400. The driver assistance device 400 may perform the driver assistance function based on the result of determination of the driving lane.

Figure 6:
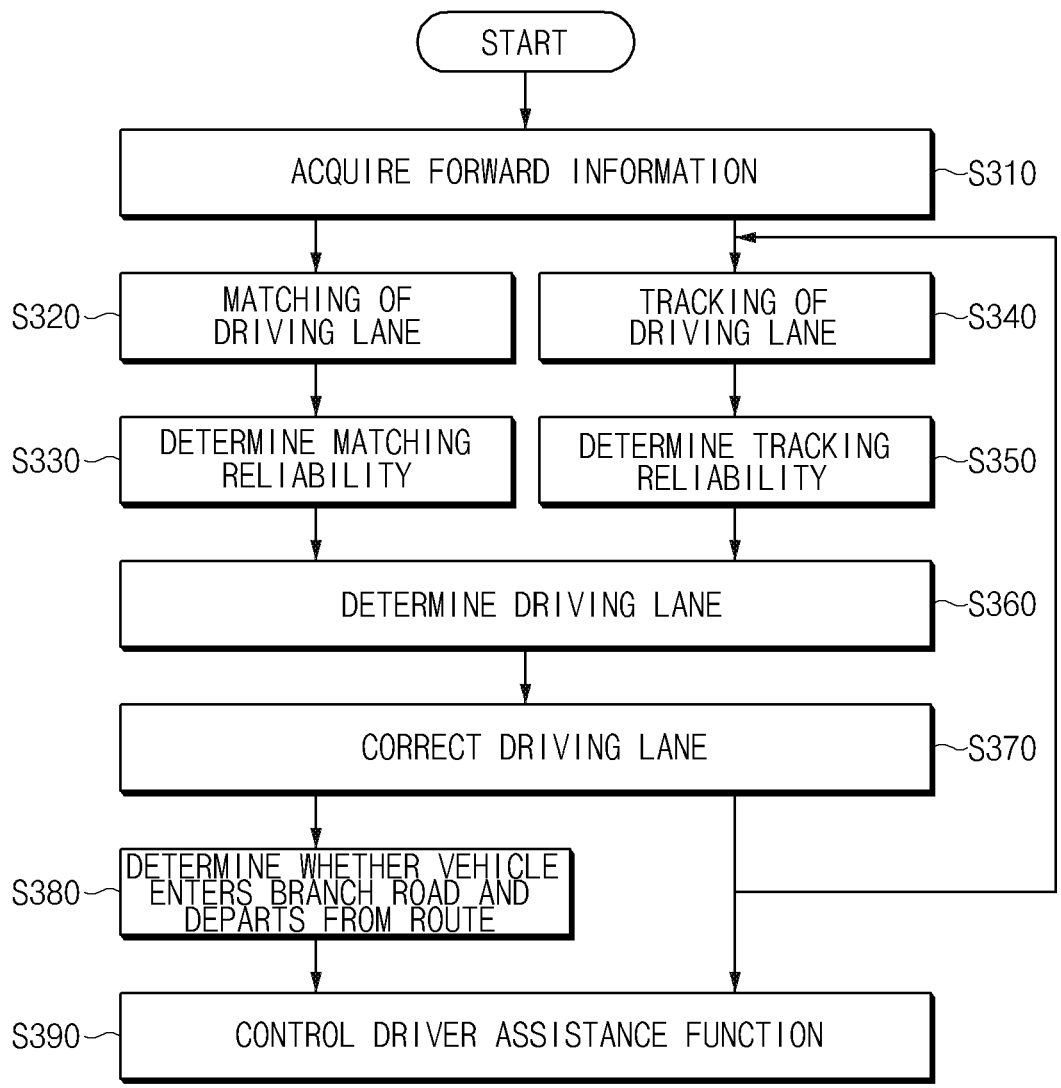
FIG. 6 is a flowchart of a method of recognizing a driving lane of a vehicle according to another embodiment of the present disclosure.

FIG. 6 is a flowchart of a method of recognizing a driving lane of a vehicle according to another embodiment of the present disclosure.

The driving lane recognition device 300 may acquire forward information (S310). The information acquisition device 310 of the driving lane recognition device 300 may identify the forward information of the vehicle using at least one of the camera 210 and the radar 220. In addition, the driving lane recognition device 300 may identify the forward information of the vehicle based on driving road information acquired from the navigation device 100.

The driving lane recognition device 300 may perform matching of the driving lane using the acquired forward information (S320). The driving lane recognition device 300 may assign a matching point to each lane of the driving road, and perform matching of the driving lane using the assigned matching point.

The driving lane recognition device 300 may determine matching reliability for matching of the driving lane (S330). Here, the matching reliability may mean a highest probability among probabilities that a lane is a driving lane for lanes.

The driving lane recognition device 300 may perform tracking of the driving lane using the acquired forward information (S340). The driving lane recognition device 300 may identify a change in the lateral distance of the vehicle (that is, whether lane change occurs) by analyzing image information acquired by the camera 210. The driving lane recognition device 300 may perform tracking of the driving lane using the driving lane determined in the immediately preceding cycle and a change in the lateral distance.

The driving lane recognition device 300 may determine tracking reliability for tracking of the driving lane (S350). Here, the tracking reliability may be identified by using the fusion reliability, which is the accuracy for the driving lane determined in the immediately preceding cycle, and reliability of the change in the lateral distance.

The driving lane recognition device 300 may determine the driving lane by fusion of the result of matching of the driving lane and the result of tracking of the driving lane based on the matching reliability and tracking reliability (S360). The driving lane recognition device 300 may determine, as the driving lane, the lane with higher reliability among the lane identified by matching of the driving lane and the lane identified by tracking of the driving lane.

The driving lane recognition device 300 may correct the determined driving lane when a left entrance/exit section is recognized in front of the vehicle (S370). The driving lane recognition device 300 may identify the entrance/exit section located on the front left side of the vehicle based on the acquired forward information. The driving lane recognition device 300 may correct the number of lanes of a driving road in the entrance/exit section and correct the determined driving lane using the corrected number of lanes of the driving road.

The driving lane recognition device 300 may determine whether a road is branched and the vehicle departs from the route based on the corrected driving lane (S380). The driving lane recognition device 300 may determine whether the vehicle enters a branch road by comparing the result of determination of the corrected driving lane with information on the branch road ahead. The driving lane recognition device 300 may determine whether the vehicle departs the route based on the result of determining whether the vehicle enters a branch road and the information on the branch road.

The driving lane recognition device 300 may control the driver assistance function based on the corrected driving lane (S290). The driving lane recognition device 300 may transmit the result of determination of the corrected driving lane to the driver assistance device 400. The driver assistance device 400 may perform the driver assistance function based on the result of determination of the corrected driving lane.

Figure 7A:
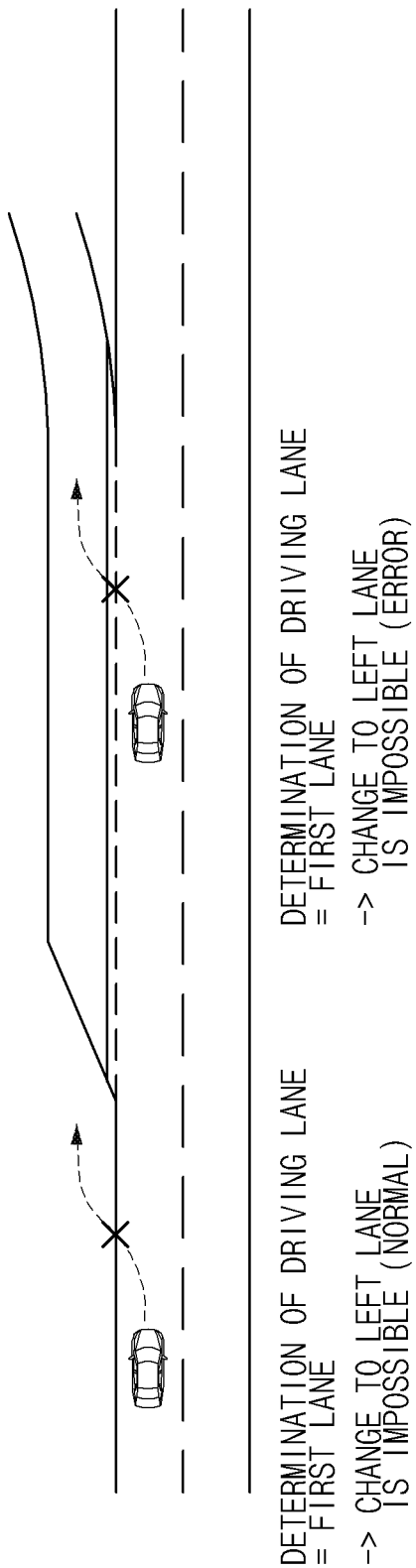
FIGS. 7A and 7B are diagrams for describing an example of preventing malfunction of a lane change assist function in a left exit section according to an embodiment of the present disclosure.
Figure 7B:
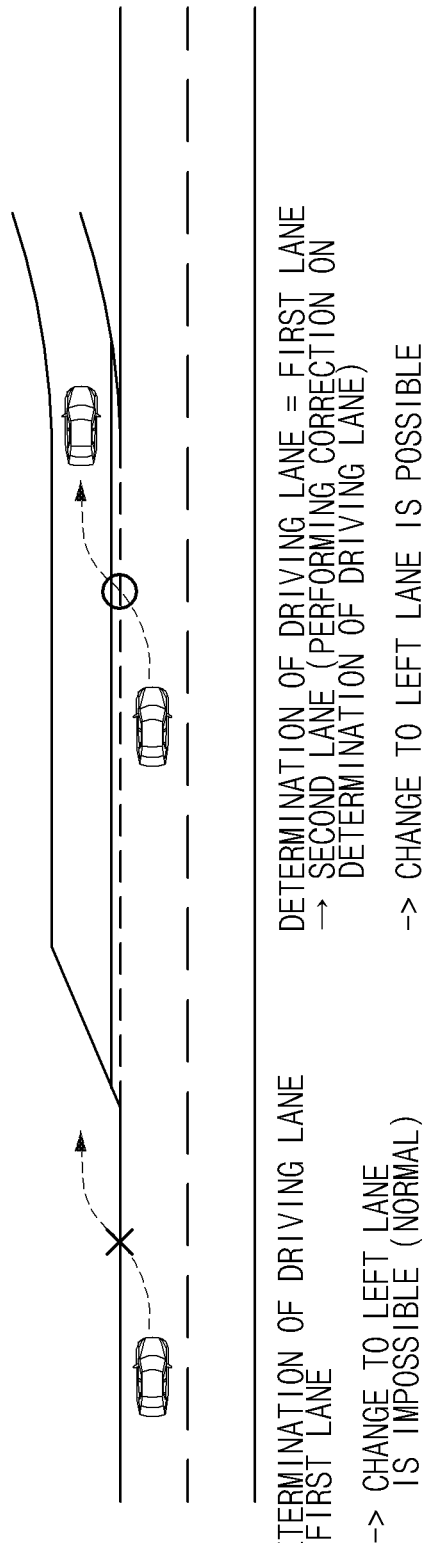

FIGS. 7A and 7B are diagrams for describing an example of preventing malfunction of a lane change assist function in a left exit section according to an embodiment of the present disclosure.

The lane change assistance function does not support change of a lane to a left lane when the vehicle is driving in the first lane. As shown in FIGS. 7A and 7B, when the vehicle is driving on the first lane of the main road, the vehicle driving lane recognition device 300 may determine the first lane as the driving lane. Subsequently, in a case where correction is not performed on result of determination of the driving lane when the vehicle enters the exit section, as shown in FIG. 7A, the driving lane recognition device 300 may determine the first lane as the driving lane in the exit section and determine that it is hard to change the lane to the left lane, causing error that deactivates the lane change assistance function. On the other hand, in a case where correction is performed on the result of determination of the driving lane when the vehicle enters the exit section, as shown in FIG. 7B, the driving lane recognition device 300 of the vehicle may perform correction from the first lane to the second lane as a result of determination of the driving lane through correction of the number of lanes of the driving road in the exit section. Therefore, it may be possible to determine that change to the left lane is possible and activate the lane change assistance function.

Figure 8A:
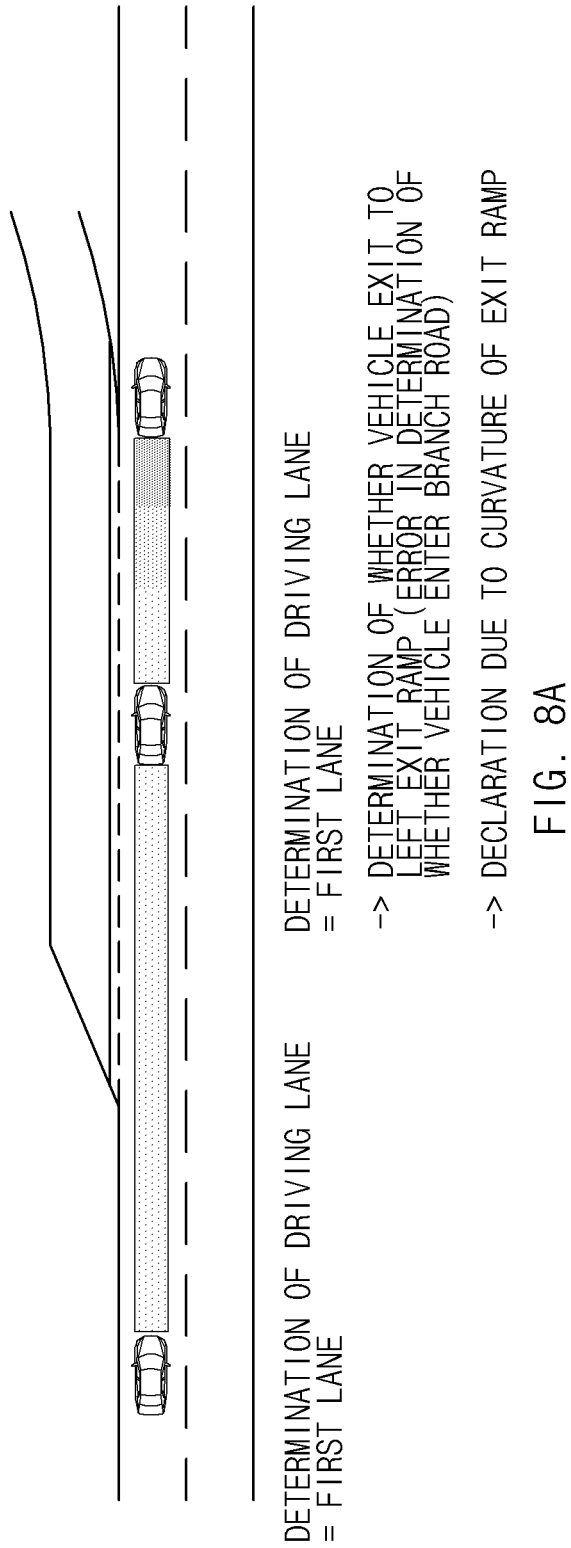
FIGS. 8A and 8B are diagrams for explaining an example of preventing malfunction of a motorway on-/off-ramp deceleration function in a left exit section according to an embodiment of the present disclosure.
Figure 8B:
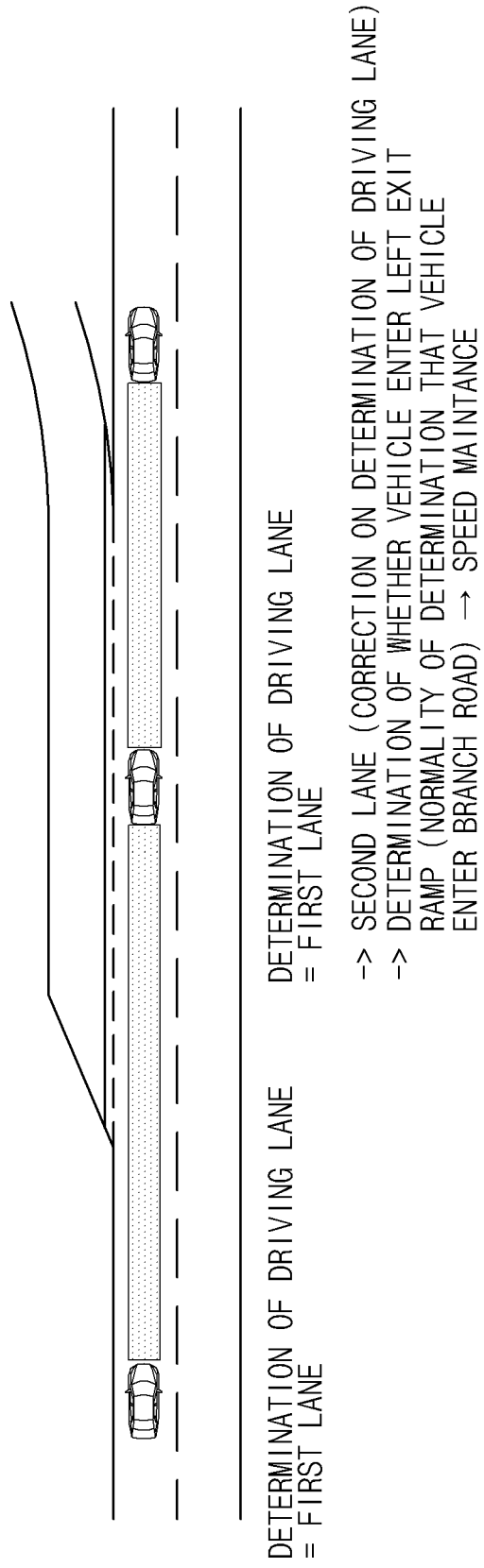

FIGS. 8A and 8B are diagrams for explaining an example of preventing malfunction of an on-/off-ramp deceleration function in a left exit section with respect to a dedicated road according to an embodiment of the present disclosure.

The motorway on-/off-ramp deceleration function may support deceleration based on the curvature of the on-/off-ramp when entering the on-/off-ramp in the motorway (e.g., highway). As shown in FIGS. 8A and 8B, when the vehicle is driving on the first lane of the main road, the vehicle driving lane recognition device 300 may determine the first lane as the driving lane. Thereafter, in a case where correction is not performed on the result of determination of the driving lane when entering the exit section, as shown in FIG. 8A, the driver assistance device 400 may determine that the vehicle enters the left off-ramp because the driving lane determined by the driving lane recognition device 300 is the first lane and support deceleration due to the curvature of the off-ramp, leading to an increase in risk of rear collision accidents due to unnecessary deceleration. On the other hand, in a case where correction is performed on the result of determination of the driving lane when the vehicle enters the exit section, as shown in FIG. 8B, the driving lane recognition device 300 of the vehicle may perform correction from the first lane to the second lane as a result of determination of the driving lane through correction of the number of lanes of the driving road in the exit section. The driver assistance device 400 may determine whether the vehicle enters the left off-ramp because the corrected result of the determination of the driving lane is the second lane and allow the vehicle to maintain a vehicle speed when the vehicle does not enter the left off-ramp.

Figure 9:
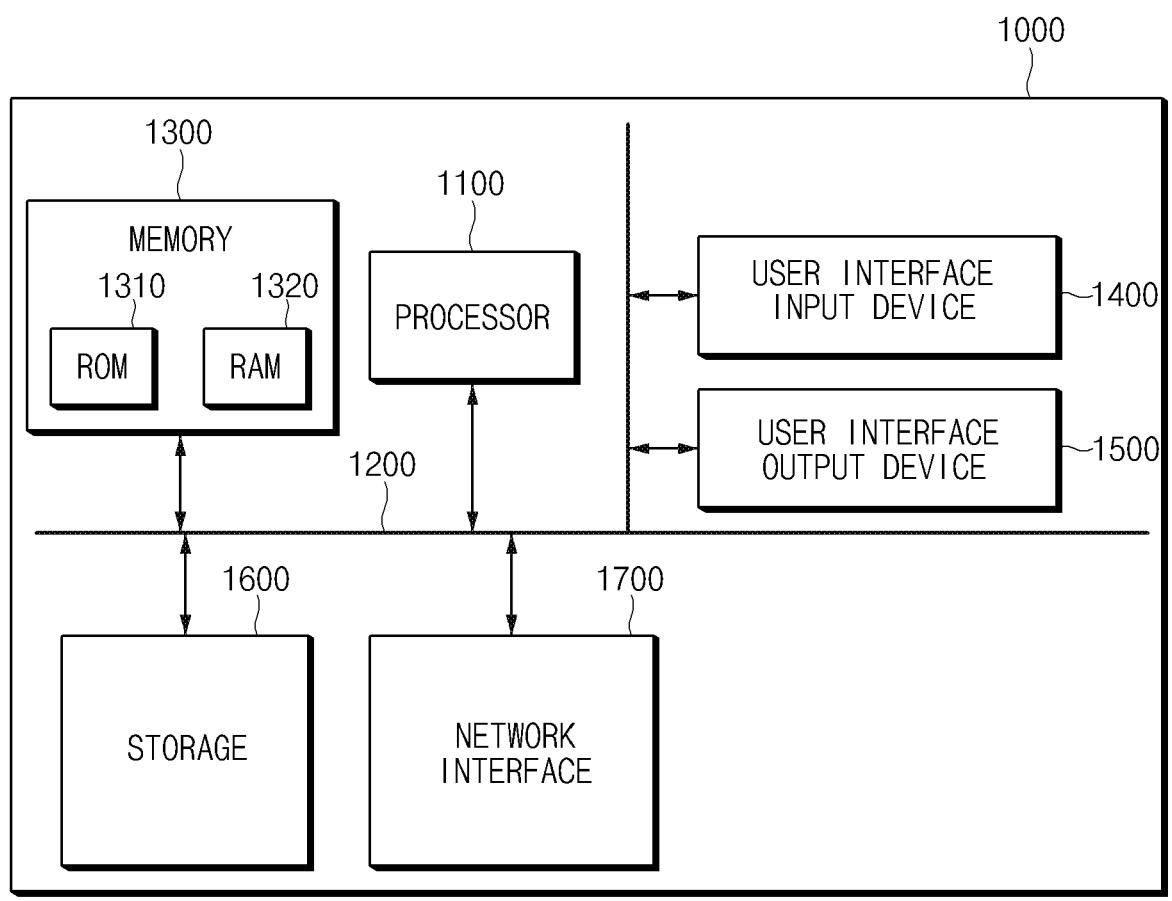
FIG. 9 is a block diagram illustrating a computing system for executing a method of recognizing a driving lane of a vehicle according to an embodiment of the present disclosure.

FIG. 9 is a block diagram illustrating a computing system for executing a method of recognizing a driving lane of a vehicle according to an embodiment of the present disclosure.

Referring to FIG. 9, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The above description is merely illustrative of the technical idea of the present disclosure, and various modifications and variations may be made without departing from the essential characteristics of the present disclosure by those skilled in the art to which the present disclosure pertains. Accordingly, the embodiment disclosed in the present disclosure is not intended to limit the technical idea of the present disclosure but to describe the present disclosure, and the scope of the technical idea of the present disclosure is not limited by the embodiment. The scope of protection of the present disclosure should be interpreted by the following claims, and all technical ideas within the scope equivalent thereto should be construed as being included in the scope of the present disclosure.

According to the present disclosure, the driving lane of the vehicle is recognized in consideration of a change in the number of lanes of the driving road in the entrance/exit section located on the front left side of the vehicle, preventing malfunction of the driver assistance function.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for recognizing a driving lane of a vehicle, the apparatus comprising:
   an information acquisition device configured to acquire forward information of a road on which the vehicle is driving; and
   a processor configured to:
      recognize an entrance section and an exit section on a front side of the vehicle based on the forward information; and
      determine the driving lane of the vehicle by correcting a number of lanes of the road in the entrance section and the exit section,
   wherein the processor is further configured to:
      perform matching of the driving lane and tracking of the driving lane using the forward information; and
      determine the driving lane by combining the matching of the driving lane and the tracking of the driving lane, and
   wherein the processor is further configured to:
      determine matching reliability for the matching of the driving lane; and
      determine tracking reliability for the tracking of the driving lane.

2. The apparatus of claim 1, wherein the processor is further configured to:
   determine the driving lane by combining the matching of the driving lane and the tracking of the driving lane based on the matching reliability and the tracking reliability.

3. The apparatus of claim 2, wherein the processor is configured to:
   correct the number of lanes of the road using a number of lanes of an on-ramp and an off-ramp;
   determine a correction type based on information on start and end points of the on-ramp and the off-ramp; and
   correct the tracking of the driving lane according to the correction type.

4. The apparatus of claim 3, wherein the processor is further configured to:

calculate the number of lanes of the road using a number of lanes of a main road before a junction point and a number of lanes of an on-ramp when recognizing the entrance section.

5. The apparatus of claim 3, wherein the processor is further configured to:
calculate the number of lanes of the road using a number of lanes of a main road after a branch point and a number of lanes of the off-ramp when recognizing the exit section.

6. The apparatus of claim 3, wherein the processor is further configured to:
correct the tracking of the driving lane based on a current driving lane, a number of lanes of the entrance section and the number of lanes of the road before a junction point when the correction type is an entrance-section start point.

7. The apparatus of claim 3, wherein the processor is further configured to:
correct the tracking of the driving lane based on a current driving lane, a number of lanes before the entrance section and a number of lanes of the entrance section when the correction type is an entrance-section end point.

8. The apparatus of claim 3, wherein the processor is further configured to:
correct the tracking of the driving lane based on a current driving lane, a number of lanes of the exit section and a number of lanes of a main road after a junction point when the correction type is an exit-section start point.

9. The apparatus of claim 3, wherein the processor is further configured to:
correct the tracking of the driving lane based on a current driving lane, a number of lanes before the exit section and a number of lanes of the exit section when the correction type is an exit-section end point.

10. The apparatus of claim 3, wherein the processor is further configured to:
perform the matching of the driving lane and the tracking of the driving lane using the forward information;
determine the matching reliability for the matching of the driving lane;
determine the tracking reliability for the tracking of the driving lane;
determine the driving lane by combining the matching of the driving lane and the tracking of the driving lane based on the matching reliability and the tracking reliability; and
correct the determined driving lane using the corrected number of lanes of the road.

11. A method for recognizing a driving lane of a vehicle, the method comprising:
acquiring forward information of a road on which the vehicle is driving;
recognizing an entrance section and an exit section on a front side of the vehicle based on the forward information; and
determining the driving lane of the vehicle by correcting a number of lanes of the road in the entrance section and the exit section,
wherein the determination of the driving lane of the vehicle includes:
performing matching of the driving lane using the forward information;
performing tracking of the driving lane using the forward information;
determining matching reliability for the matching of the driving lane;
determining tracking reliability for the tracking of the driving lane;
correcting the tracking of the driving lane using the corrected number of lanes of the driving road; and
determining the driving lane by combining the matching of the driving lane and the tracking of the driving lane based on the matching reliability and the tracking reliability.

12. The method of claim 11, wherein the correcting of the tracking of the driving lane includes:
correcting the number of lanes of the road using a number of lanes of an on-ramp and an off-ramp;
determining a correction type based on information on start and end points of the on-ramp and the off-ramp; and
correcting the tracking of the driving lane according to the correction type.

13. The method of claim 12, wherein the correcting of the number of lanes of the driving road includes:
calculating the number of lanes of the road using a number of lanes of a main road before a junction point and a number of lanes of the on-ramp when recognizing the entrance section.

14. The method of claim 12, wherein the correcting of the number of lanes of the road includes:
calculating the number of lanes of the road using a number of lanes of a main road after a branch point and a number of lanes of the off-ramp when recognizing the exit section.

15. The method of claim 12, wherein the correcting of the tracking of the driving lane according the correction type includes:
correcting the tracking of the driving lane based on a current driving lane, a number of lanes of the entrance section and the number of lanes of the driving road before a junction point when the correction type is an entrance-section start point; and
correcting the tracking of the driving lane based on a current driving lane, a number of lanes before the entrance section and a number of lanes of the entrance section when the correction type is an entrance-section end point.

16. The method of claim 12, wherein the correcting of the tracking of the driving lane according the correction type includes:
correcting the tracking of the driving lane based on a current driving lane, a number of lanes of the exit section and the number of lanes of a main road after a junction point when the correction type is an exit-section start point; and
correcting the tracking of the driving lane based on a current driving lane, a number of lanes before the exit section and a number of lanes of the exit section when the correction type is an exit-section end point.

17. The method of claim 11, wherein the determination of the driving lane of the vehicle includes:
performing matching of the driving lane using the forward information;
performing tracking of the driving lane using the forward information;
determine matching reliability for the matching of the driving lane;
determine tracking reliability for the tracking of the driving lane;

determine the driving lane by combining the matching of the driving lane and the tracking of the driving lane based on the matching reliability and the tracking reliability; and correcting the determined driving lane using the corrected number of lanes of the road.

\* \* \* \* \*